Figure 1:
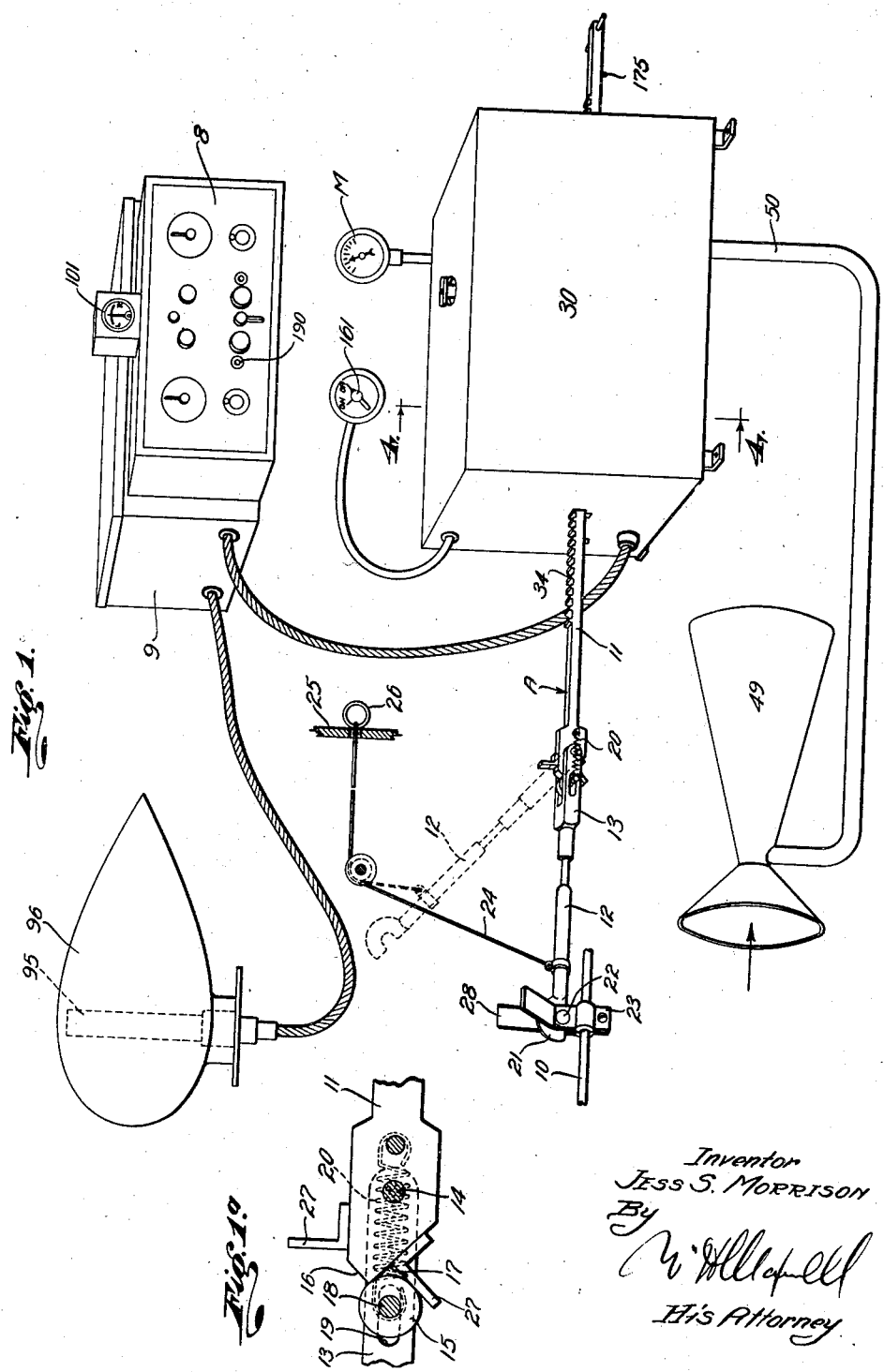

June 20, 1944.  J. S. MORRISON  2,351,694
AUTOMATIC CONTROL FOR AIRCRAFT, ETC
Filed Aug. 14, 1939  6 Sheets-Sheet 3

Inventor
Jess S. Morrison
By
His Attorney

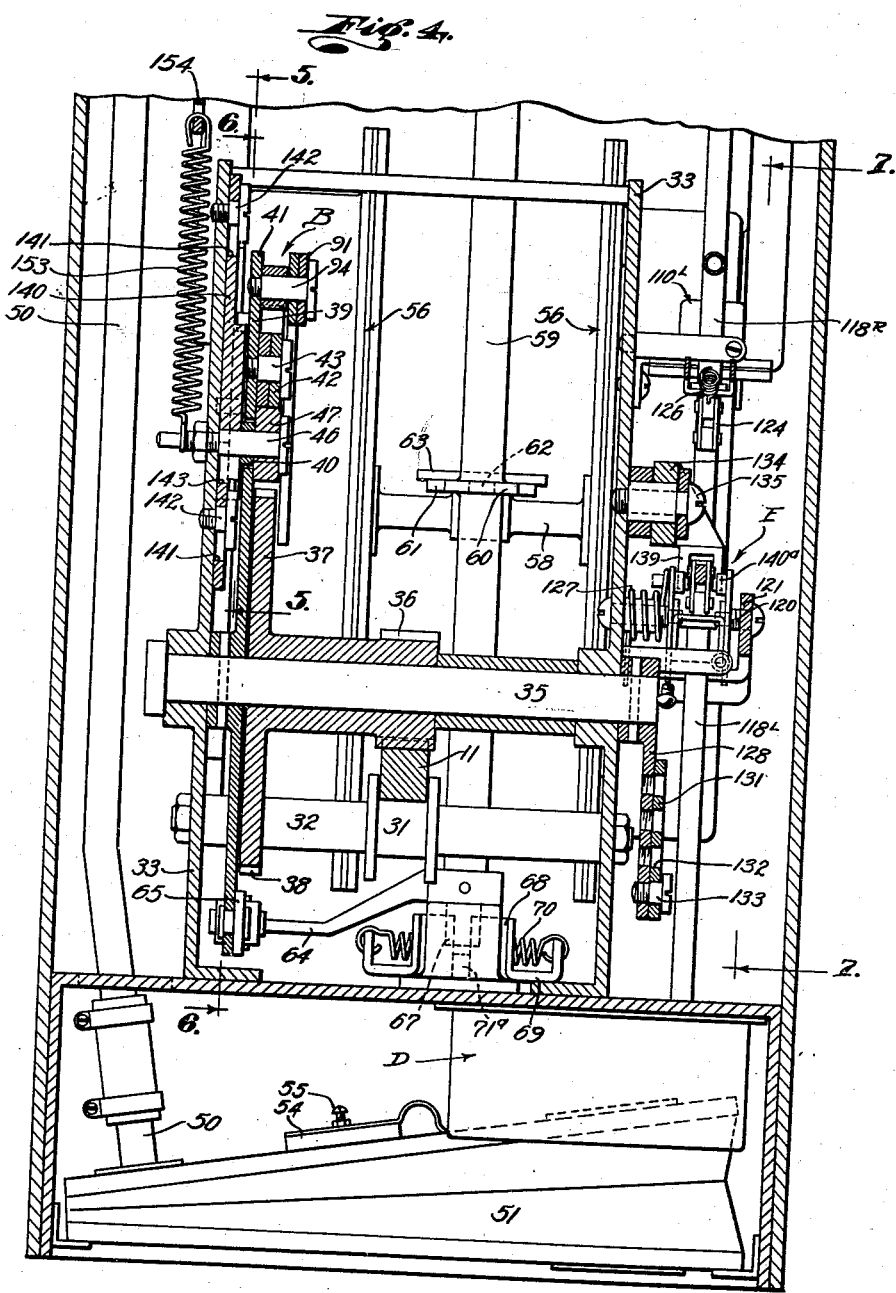

June 20, 1944.  J. S. MORRISON  2,351,694
AUTOMATIC CONTROL FOR AIRCRAFT, ETC
Filed Aug. 14, 1939  6 Sheets-Sheet 5
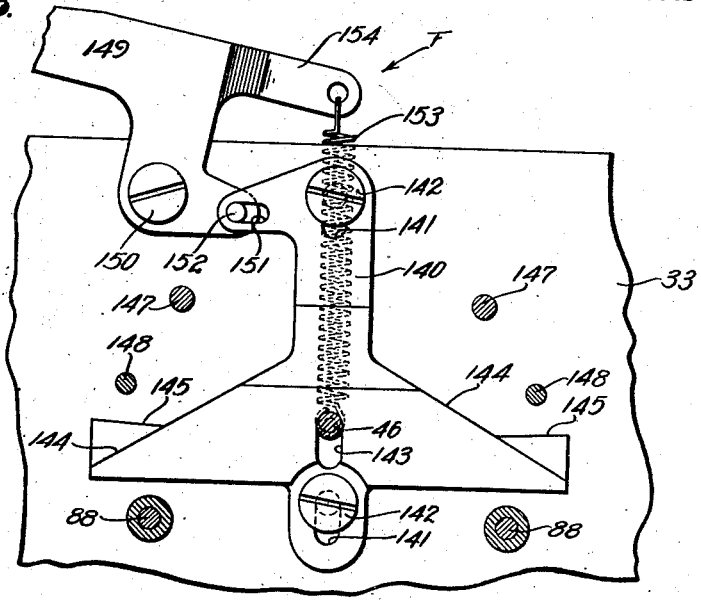
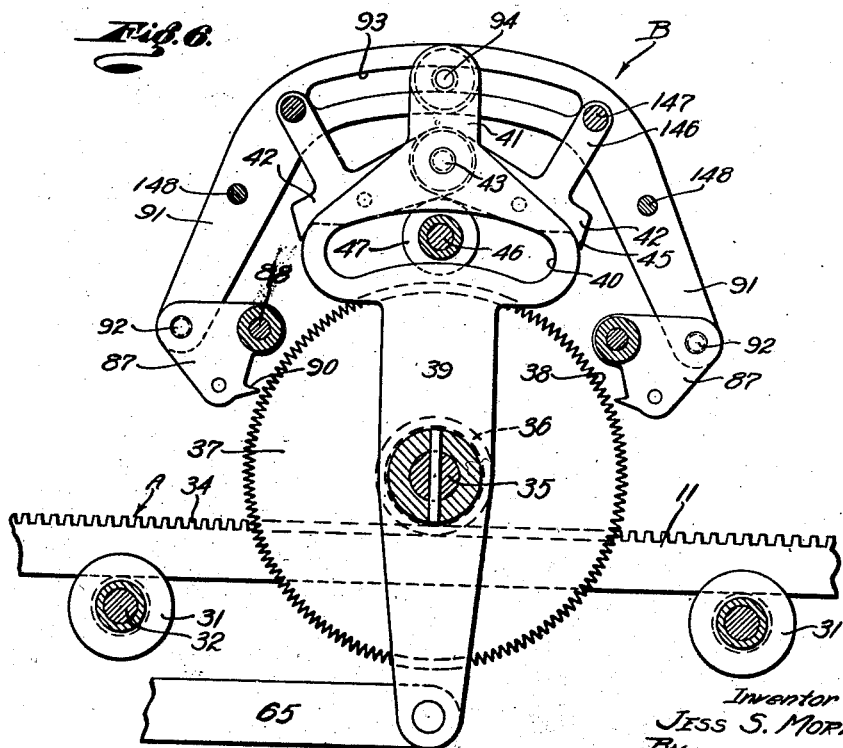
Inventor
JESS S. MORRISON
By
W. H. Calwell
His Attorney June 20, 1944.  J. S. MORRISON  2,351,694
AUTOMATIC CONTROL FOR AIRCRAFT, ETC
Filed Aug. 14, 1939  6 Sheets-Sheet 6
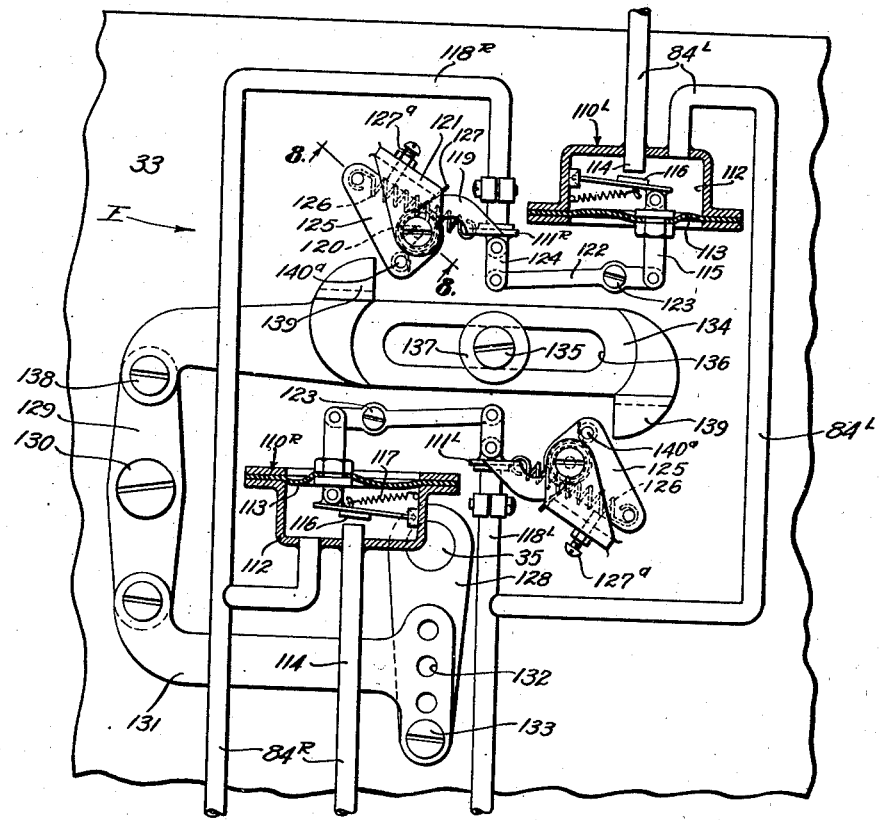
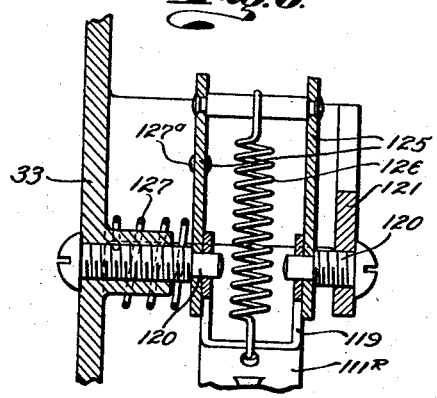
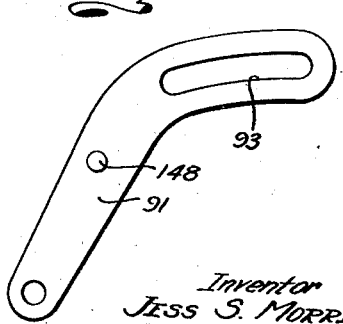
Inventor
JESS S. MORRISON
By
His Attorney Patented June 20, 1944

2,351,694

UNITED STATES PATENT OFFICE 2,351,694

AUTOMATIC CONTROL FOR AIRCRAFT, ETC.

Jess S. Morrison, Southgate, Calif., assignor to Leo M. Harvey, La Canada, Calif.

Application August 14, 1939, Serial No. 291,478

12 Claims. (Cl. 244—78)

This invention relates to the control of air craft, vessels, vehicles, etc. and relates more particularly to an automatic pilot, or control means, for the control of air craft, land and sea craft, torpedoes, etc. A general object of this invention is to provide a practical, dependable and very effective automatic pilot or automatic control of the character mentioned.

Another object of this invention is to provide an automatic pilot or control that may be governed by directional radio circuits, gyroscopes, mercury switches, or other suitable sensitive means, and that is suitable for the control of the steering rudder or other control part for directional control, the elevator for altitude control, the ailerons for lateral control, auxiliary surfaces for trimming the craft or for the control of any other steering or control part of the craft, vessel, or vehicle.

Another and important object of the invention is to provide an automatic pilot or control of the character mentioned that is responsive to and is adapted to be controlled by any selected radio broadcast to maintain the craft on the course as defined by broadcast.

Another object of this invention is to provide an automatic pilot or control of the character mentioned that is useful as an optional control means being quickly put into operation where blind flying is desired or required, or where the pilot is fatigued or otherwise disabled, and being quickly and readily made inactive and fully released from the control surface or element of the craft so that the craft may be under the full control of the operator or pilot without drag or resistance by the automatic control means.

Another object of this invention is to provide an automatic pilot that is very light in weight and compact, particularly adapting it for use on aircraft, etc.

Another object of this invention is to provide an automatic pilot of the character mentioned that moves or advances the rudder or other control part of the craft or vessel in a manner to produce the most advantageous result.

Another object of this invention is to provide an automatic control or pilot for air craft, etc., that is constructed to be easily serviced and repaired. The device or control of the present invention may be easily repaired and serviced by persons or mechanics without special training.

A further object of this invention is to provide an automatic pilot of the character mentioned that is inexpensive to manufacture and install.

Figure 2:
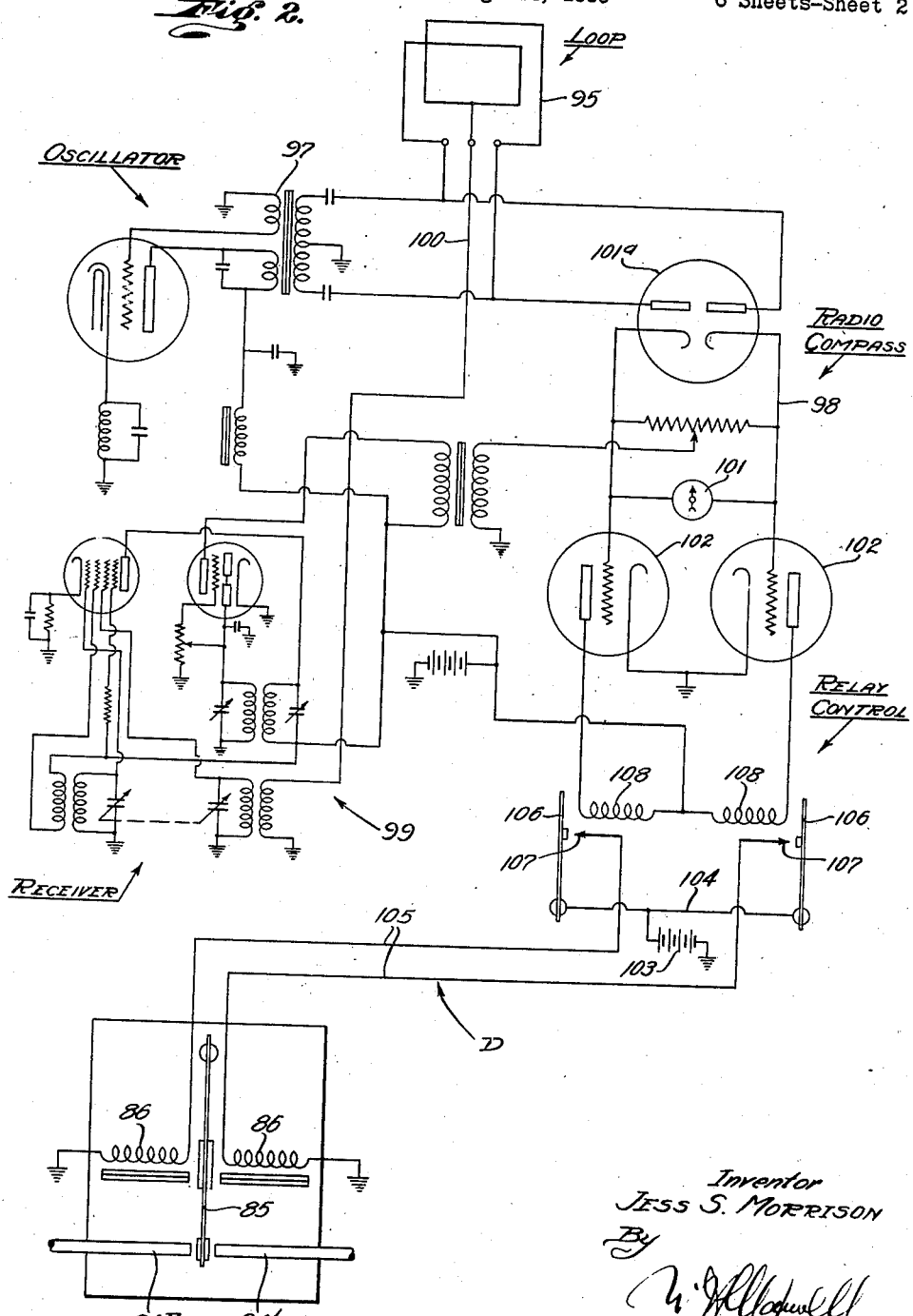
Figure 3:
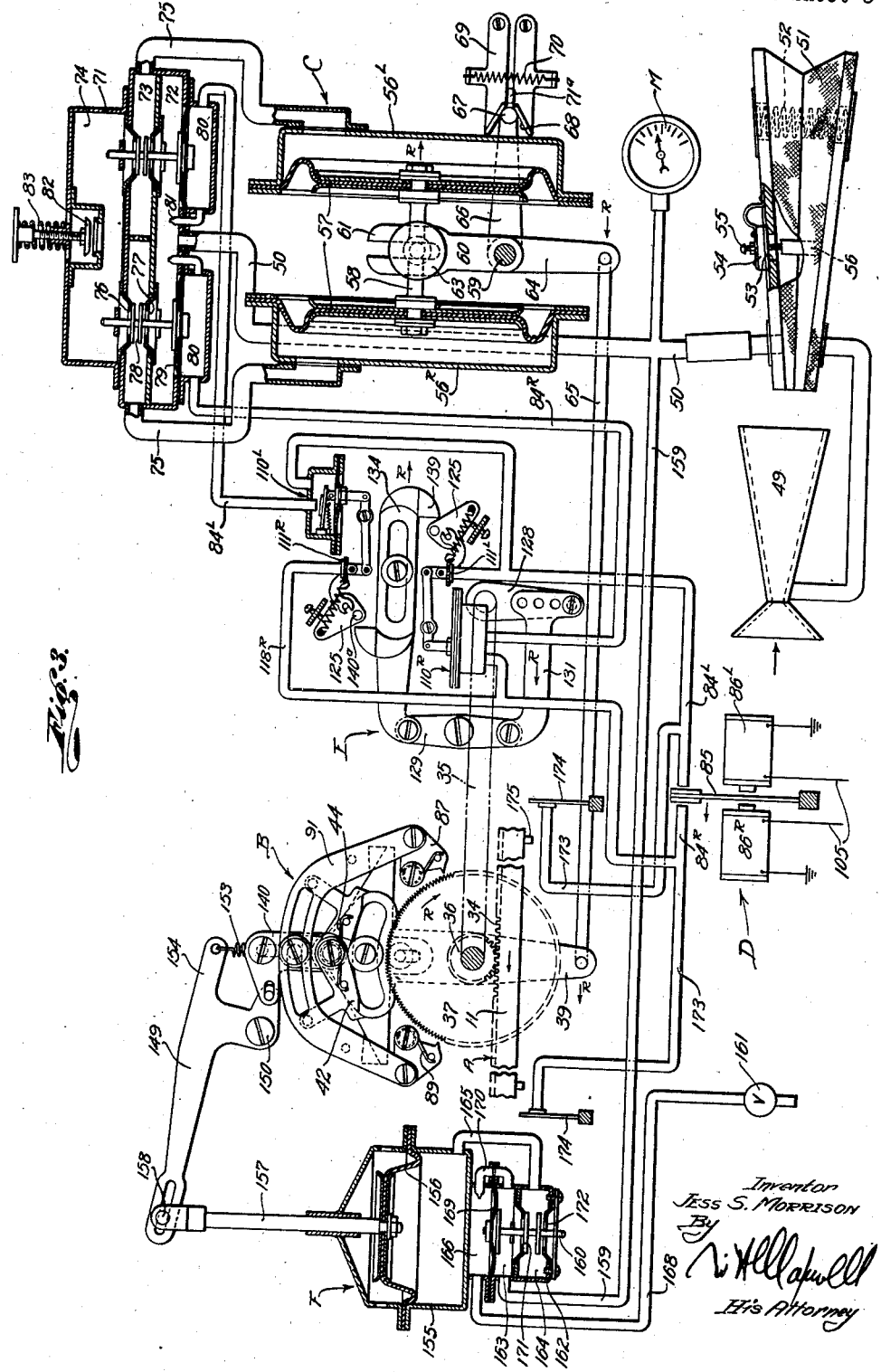

The various objects and features of my invention will be fully understood from the following detailed description of a typical preferred form and application of the invention, throughout which description reference is made to the accompanying drawings, in which:

Fig. 1 is a diagrammatic view of the automatic pilot or control of the present invention showing the various elements or units of the control in perspective and in spaced relation. Fig. 1ᵃ is an enlarged vertical detailed sectional view of the connection between the rack and the releasable link. Fig. 2 is a wiring diagram of the circuits embodied in the control means. Fig. 3 is a diagrammatic view of the principal elements of the automatic pilot or control. Fig. 4 is a fragmentary enlarged vertical detailed sectional view taken substantially as indicated by line 4—4 on Fig. 1. Fig. 5 is an enlarged fragmentary vertical detailed sectional view taken as indicated by line 5—5 on Fig. 4. Fig. 6 is an enlarged fragmentary vertical detailed sectional view taken as indicated by line 6—6 on Fig. 4. Fig. 7 is an enlarged, fragmentary, vertical detailed sectional view taken as indicated by line 7—7 on Fig. 4. Fig. 8 is an enlarged detailed sectional view taken on line 8—8 on Fig. 7. Fig. 9 is a side view of one of the links of the ratchet means.

The automatic control or automatic pilot of the present invention may be said to comprise, generally, operating means A connected with the rudder, elevators, or other control surface or part of the craft, means B operable to advance or operate the means A in either direction, reversible power means C for operating the means B, an automatic control D for the power means C, restoring means or timer means E associated with the control D and operable to cause the power means C to intermittently or repeatedly actuate the means B, and means F for releasing the means B or for rendering the means B inactive.

The means A is connected with the part of the craft, vessel, or vehicle to be operated or governed. As above pointed out the automatic control or pilot of the invention is useful for operating or controlling vehicles and vessels of various natures and is suitable for the operation of steering, stabilizing, and elevating parts of practically any kind. The means A may be arranged and constructed for connection with and for the operation of controlling and steering parts of different kinds. In the typical case illustrated it may be considered that the means A is connected with the vertical rudder or directional rudder (not shown) of an air craft. In Fig. 1 I have shown a portion of a stem or rod 10 that may be considered as extending to and connected with the rudder.

The means A includes a longitudinally shiftable or reciprocable element in the nature of a toothed rack 11 releasably operatively connected with the rudder rod 10. A link 12 serves to operatively connect the rack 11 with the rod 10 and is releasable by the operator to free the rudder rod from the automatic control mechanism. The inner end of the connecting link 12 is pivotally connected with the rack 11. A yoke 13 is provided on the inner end of the link 12 and receives the adjacent end portion of the rack 11. A pivot pin 14 connects the yoke 13 with the rack 11. A roller 15 is arranged in the yoke 13 to cooperate with pitched faces 16 and 17 on the end of the rack 11. The shaft 18 of the roller 15 shifts in slots 19 in the yoke 13 and springs 20 are connected with the roller shaft 18 to urge the roller against the pitched faces 16 and 17.

A hook 21 is provided on the outer end of the link 12 to cooperate with a pin 22 carried by a collar 23 fixed to the rod 10. When the link 12 is in its normal position substantially parallel with the rack 11 the hook 21 cooperates with the pin 22 and the roller 15 bears against the pitched surface 17 to releasably retain the link in place. The hook 21 cooperating with the pin 22 is operable to transmit movement between the link 12 and the rudder rod 10. A remote control is provided for releasing the hook 21 from the pin 22 to disconnect the automatic pilot mechanism from the rudder rod 10. A cable or line 24 is connected with the link 12, and extends to the instrument panel 25 where it is provided with a readily accessible operating ring 26. When the ring 26 is pulled the link 12 is raised to release the hook 21 from the pin 22. This brings the roller 15 into cooperation with the pitched face 16 and the spring held roller cooperating with the face 16 retains the link 12 in its raised released position. Stops 27 are provided on the rack 11 to stop the link 12 in its two positions. Guides 28 may be provided on the collar 23 to guide the hook 21 to the pin 22. The hook 21 normally cooperates with the pin 22 to connect the automatic pilot means with the rudder or control rod 10 and is only released in an emergency or in the event that the automatic pilot means fails or jams. It is to be understood that the linkage between the rudder or control part of the craft and the rack 11 may include universal joints, direction changing connections, etc. as may be required.

The rack 11 of the means A extends into a box or case 30 where it is supported for free reciprocable movement. The rack 11 may be carried and guided by spaced flanged rollers 31 supported by horizontal shafts 32. The shafts 32 are carried in openings in spaced supporting plates 33 mounted in the case 30. With the rack 11 arranged as just described, its teeth 34 extend along its upper side. The series of rack teeth 34 is preferably of substantial length.

The means B is provided to move or operate the rack 11 in either direction for the control of the rudder rod or control rod 10. The means B is in the nature of a releasable double acting ratchet and gear mechanism operated by the power means C and geared to the rack 11. In the construction illustrated the means B includes a shaft 35 disposed at right angles to the rack 11 and rotatably supported in the case 30 by the spaced plates 33. A pinion or gear 36 is freely turnable on the shaft 35 and meshes with the rack 11. A ratchet wheel 37 is fixed to or turnable with the gear 36. The wheel 37 is of substantial diameter and its peripheral teeth 38 are designed for engagement by ratchets or pawls working in both directions.

The means B further includes a double lever or rocker 39 pinned or otherwise fixed to the shaft 35 and operated or swung by the power means C as will be later described. The upper arm of the rocker 39 is provided with an arcuate slot 40 and a reduced head 41 above the slot. Oppositely directed dogs or pawls 42 are supported in side by side relation on a pin 43 projecting from the rocker 39 above the slot 40. Springs 44 act on the pawls 42 to urge them downwardly and inwardly toward the wheel 37. The points or blades 45 of the pawls 42 are shaped for cooperation with the teeth 38 of the wheel 37. A pin 46 is fixed to the adjacent supporting plate 33 and passes through the slot 40 of the rocker 39. The pin 46 carries a freely rotatable roller 47 which cooperates with the lower edges of the pawls 42. With the rocker 39 in its normal vertical or neutral position the roller 47 cooperates with the two pawls 42 to hold them released and spaced from the ratchet wheel 37. When the rocker 39 is pivoted by the power means C the axis of the pawls 42 moves relative to the fixed axis of the roller 47 and one pawl 42 is further retracted from the wheel 37 while the other pawl is allowed to pivot downwardly into cooperation with the wheel under the action of its spring 44. The blade 45 of the pawl 42 cooperates with a ratchet wheel tooth 38 to turn the wheel and shift the rudder rod or control rod 10 through the medium of the gear 36 and rack 11. In practice, the movement thus imparted to the rudder rod 10 is slight and the extent of the movement transmitted may be varied by adjusting the means E as will be subsequently described. Upon the return of the rocker 39 to its original generally vertical position the engagement of the roller 47 with the pawls 42 restores the two pawls to their normal released positions. The rocker 39 is adapted to be swung in opposite directions by the power means C and the pawls 42 face in opposite directions to impart clockwise and counter-clockwise turning movement to the ratchet wheel 37.

The means B further includes holding dogs 87 for preventing return or reverse movement of the ratchet wheel 37. When the automatic pilot or control is in operation to move the craft's control surface or part in a given direction the rocker 39 oscillates in such a manner that a pawl 42 intermittently turns the wheel 37 to advance or move the rod 10 in a given direction. The rocker 39 oscillates between a partially turned position and a fully turned position so long as the operation continues and when the control surface or part of the craft has been brought to a position to return the craft to its course or intended position the rocker 39 returns to its normal vertical position. The dogs 87 are cooperable with the teeth 38 of the wheel 37 to prevent reverse turning of the wheel by the pawls 42 during the return movements of the rocker 39 and to prevent the action of external forces on the rudder or control part of the craft from reversing the rudder or control part. The dogs 87 are pivoted on fixed pivot pins 88 on the adjacent supporting plate 33 to be adjacent the wheel 37 and to be at opposite sides of the wheel. Springs 89 urge the dogs 87 toward the periphery of the wheel 37 and the dogs are provided with bevelled teeth or blades 90 for cooperating with the ratchet wheel teeth 38. One dog 87 is positioned to prevent clockwise turning of the wheel 37 and the other dog is arranged to prevent counter-clockwise turning of the wheel.

The ratchet dogs 87 are interconnected with the rocker 39 to be controlled by movement of the rocker. Angular or arcuate links 91 are connected with the dogs 87 by pivot pins 92 and extend upwardly and toward one another. The links 91 are provided with elongate arcuate slots 93 which receive or pass a pin 94 provided on the rocker head 41. The upper portions of the links 91 are in side by side relation so that the pin 94 may pass through their registering slots 93. The springs 89 tend to pivot the dogs 87 inwardly toward the ratchet wheel 37 and tend to draw the links 91 downwardly. The parts are related so that the upper ends of the slots 93 cooperate with the pin 94 when the rocker 39 is in its normal position and this cooperation holds the dogs 87 in released positions where their blades 90 are free of the ratchet teeth 38.

Upon swinging of the rocker 39 to the right the pin 94 tends to move away from the end of the slot 93 in the righthand link 91 and the spring 89 draws the link downwardly so that it follows or moves with the rocker and the spring pivots the righthand ratchet dog 87 to bring its blade 90 into engagement with the ratchet teeth 38. The ratchet dog blade 90 comes into cooperation with the ratchet wheel teeth 38 before the blade 45 of the righthand pawl 42 comes into moving engagement with the ratchet wheel teeth. When the wheel 37 is turned by the pawl 42 the teeth 38 ratchet past the spring held dog 87. Upon the return of the rocker 39 the pawl blade 45 ratchets past the teeth 38 without turning the wheel 37, the wheel being held by the ratchet dog 87. During a phase of operation of the mechanism the rocker 39 does not return to its normal vertical position but remains partially pivoted to the right or left as the case may be, so that the dog 87 remains in cooperation with the ratchet wheel 37 to prevent reversal of the wheel by the action of the air flow or external force on the rudder or control part of the craft. The rocker 39 may be repeatedly swung between the partially turned position and a fully turned position to intermittently turn the wheel 37 and the ratchet dog 87 remains in effective engagement with the ratchet wheel throughout these operations. When the craft has returned to its course or intended position the rocker 39 returns to its normal generally vertical position and the pin 94 acting on the end of the slot 93 in the righthand link 91 moves the link and pivots the righthand pawl 87 to its released position. When the rocker 39 is operated in the lefthand direction the mechanism operates as described above, and the lefthand dog 87 serves to prevent a reversing or clockwise turning of the wheel 87.

Any selected or available power means may be utilized to operate or move the rocker 39 of the means B. I prefer to employ a pneumatic means or air motor operated either by positive or negative pressure, because a means of this nature is light in weight, inexpensive and easy to service. The preferred form of power means C illustrated, embodies a bellows type air motor utilizing partial vacuum or negative pressure generated either by a Venturi tube or an air pump. Where an air pump is used to produce the negative pressure or partial vacuum the pump may be driven by an auxiliary power drive or by an air driven blade in the slip stream of the craft. For the sake of simplicity I have illustrated a Venturi tube 49 as the source or generator of negative pressure for the operation of the power means C, it being understood that other means may be employed for this purpose. The Venturi tube 49 may be arranged in the slip stream or otherwise located to handle the air flow resulting from the craft's movement. A main negative pressure channel or line 50 leads from the throat of the Venturi tube 49 to the power means C.

It is preferred to interpose a negative pressure equalizer or stabilizer in the main line 50 to maintain a substantially uniform condition in the line. This device may comprise a bellows 51 whose sides are urged apart by a spring 52. An air inlet 53 in one side of the bellows 51 is controlled by a spring held valve 54. The valve 54 carries an adjustable screw 55 engageable with a post 56 on the other side of the bellows 51 to cause opening of the valve 54 when the differential between the atmospheric pressure and the negative pressure becomes excessive. The interior of the bellows 51 is, of course, in communication with the line 50 and in practice the line 50 may enter the opposite sides of the bellows. The bellows is preferably suitably mounted in the case 30. A negative pressure meter M may be connected with the line 50 and positioned to be readily visible.

The motor or power means C comprises a pair of opposed diaphragm units which I will term bellows 56. The diaphragms 57 of the bellows 56 are connected for movement in unison by a connecting rod 58. The bellows 56 are suitably mounted in the case 10, for example, they may be supported on the plates 33. A vertical shaft 59 extends between the spaced bellows 56 and is suitably journaled in the case 30. An arm 60 is fixed on the shaft 59 and has a yoke 61 engaged by a pin 62 on the connecting rod 58 so that the shaft 59 is turned by the bellows 56. A head 63 on the pin 62 cooperates with the yoke 61 to prevent disengagement of the yoke from the pin. It will be seen how movement of the bellows diaphragms 57 produces turning movement of the shaft 59. An arm 64 is fixed to the lower portion of the vertical shaft 59 and a link 65 is pivotally connected with the arm 64. The link extends to the lower arm of the rocker 39 and is pivotally connected with the rocker. The parts are related so that the rocker 39 is substantially vertical or in its neutral position to hold the pawls 42 released when the diaphragms 57 of the bellows 56 are in their neutral, unactuated positions.

Means are provided to yieldingly hold the parts in their neutral positions and to return the parts to their neutral positions following each operation. This means includes an arm 66 fixed to the vertical shaft 59 of the power means C and a pin 67 on the outer part of the arm 66. The arm 66 may be integral with or may be attached to the arm 64. The pin 67 cooperates with convergent faces 68 provided on individually pivoted levers or members 69. A spring 70 is connected between the two pivoted members 69 to urge them toward one another. A fixed stop 71ª is arranged between the members 69 to limit their inward movement. The faces 68 of the spring urged members 69 cooperate with the pin 67 to hold the arm 66 in a position where the bellows diaphragms 57 are neutral and the rocker 39 is substantially vertical. When the shaft 59 is turned through the action of the bellows 57 the pin 67 cooperating with the face 68 of a member 69 pivots that member outwardly against the action of the spring 70. During the return of the shaft 59 and the arm 66 to the original positions the spring 70 restores the member 69 to its normal position and urges the two faces 68 against the pin 67 to assist in the return of the parts and to yieldingly hold the diaphragms 57 and the rocker 39 in their neutral positions.

The air motor or power means C further includes a valve mechanism controlling the bellows 57. A valve chest 71 is provided in the case 30 adjacent the bellows 56. The chest 71 is partitioned to have a negative pressure chamber 72, two separate intermediate chambers 73 and an atmospheric pressure chamber 74. The main negative pressure line 50 extends to and communicates with the chamber 72. A line 75 extends from each intermediate chamber 73 to a bellows 56. Ports 76 connect the atmospheric pressure chamber 74 with the intermediate chambers 73 and ports 77 are provided to connect the intermediate chambers 73 with the negative pressure chamber 72. Multiple or double valves 78 control the sets of ports 76—77. The valves 78 are such that one port 76 or 77 is closed while the other port is open. Each valve 78 is operated by a diaphragm 79. The valve chest 71 has diaphragm chambers 80 for the control of the valve operating diaphragms 79. The diaphragm chambers 80 have controlled communication with the atmosphere governed by the control D and the means E and are connected with the negative pressure chamber 72 by controlled bleeders 81 that limit or restrict the air flow to normally maintain a static condition with the valves 78 in the positions where the ports 76 are closed and the ports 77 are open. A valve 82 controls the admission of air to the atmospheric pressure chamber 74. A threaded stem 83 may be adjusted to vary the position of the valve 82 and thus regulate the rate of operation of the bellows 56.

The control D is operable to control or govern the communication of the individual diaphragm chambers 80 with the atmosphere. The control D may be responsive to or operated by directional radio circuits, mercury switches, gyroscopes or other directional, stabilizing or course determining and maintaining means. In accordance with the invention the control D includes pipes or line 84L and 84R each leading from a diaphragm chamber 80 and a valve 85 for controlling the communication of these lines with the atmosphere. The lines 84R and 84L are arranged to have open outer ends in spaced opposition, and the valve 85 has its active part between the ends of the lines. The valve 85 is pivoted or supported for flexure and is movable from a normal open position where both lines 84R and 84L are open to a position where the line 84R is closed and the line 84L is open and to a position where the line 84L is closed and the line 84R is open. The single valve 85 is thus operable to control the diaphragms 79 of the valves 78 to cause operation of either bellows 56. The valve 85 carries an armature or constitutes an armature for two spaced opposed solenoid coils 86. The coils 86 are arranged to move the valve 85 from its normal position to the left or right positions to close either the line 84R or the line 84L.

Upon energization of one coil 86 the valve 85 is operated to close one of the lines 84 and thus cause operation of the power means C to move the rudder rod or control rod 10 in a given direction. Thus it will be seen that the solenoid coils 86 and the valve 85 constitute a control for the power means C that is operable to cause actuation of the means B in either direction for the turning of the rudder or control part to the right or the left.

The control means D, as illustrated in Fig. 2 of the drawings, embodies a directional radio circuit control that governs the coils 86 in such a manner that the air craft may be automatically maintained on a selected course as defined by a radio beam or directional radio broadcast or, in fact, as defined by any radio broadcast. It is a feature of the invention that the means D may be tuned to be controlled by or to be responsive to any available and selected radio broadcast and is not limited to use with special directional radio beams. The sensitive means or circuit illustrated in Figs. 1 and 2 includes a directional air craft antenna in the form of a loop 95 which may be provided with a typical Faraday shield 96 for eliminating electrostatic disturbances. The loop 95 has a typical modulated feed or tuned oscillatory circuit 97 of a given or fixed frequency and the legs or end leads of the loop 95 are connected in a suitable air craft radio compass circuit 98. A suitable tunable radio receiver circuit 99 is coupled with the radio compass circuit 98 and with the center tap 100 of the loop 95. The radio compass circuit 98 has the usual meter 101 and rectifier tube 101$^a$. It is preferred to fix the loop 95 to the craft and to arrange the loop in a plane transverse of the longitudinal axis of the craft so that deviation of the craft from its course produces a maximum electron flow from the null condition in one side or the other of the rectifier tube 101$^a$, depending upon the direction of said deviation. A suitable case 9 is provided to contain the circuits 97, 98 and 99 and a control panel 8 may be provided with the manual control parts and indicators of the circuits. The circuit 97, the loop 95, the radio receiving circuit 99 and the radio compass circuit 98 may, of course, be varied greatly in design and character and the drawings merely illustrate a simplified arrangement of these elements. It is to be understood that the invention is not to be construed as limited or restricted to the particular circuits illustrated, as the showing of these circuits is merely illustrative of elements well known to those skilled in the art and is not necessarily illustrative of preferred circuits.

The coils 86 of the control D are operated or controlled by the meter circuit of the radio compass circuit 98 through the medium of a relay system. This relay system includes two relay tubes 102. The tubes 102 have their grids connected with the opposite sides of the meter 101. The relay system further includes a suitable power source 103, a common lead 104 from the source 103 and separate leads 105 connected with the coils 86. The power source 103 and the coils 86 may be suitably grounded. Contactors 106 are connected in the power lead 104 and are engageable with contacts 107 in the coil leads 105 to complete the energizing circuits to the coils. The contactors 106 are operated by solenoid coils 108 connected in the opposite legs of the meter circuit 101 through the medium of the relay tubes 102.

Upon deviation of the craft from its course the loop 95 assumes a non-normal position with respect to the radio beam or radio broadcast, and an out of phase condition is produced in the opposite legs of the circuit 98 actuating the meter 101 and causing electron flow in the tubes 102. Due to the out of phase condition in the rectifier circuit there is positive D. C. potential with respect to ground in the grid plate of one tube 102 or the other depending upon the direction of out of phase condition in the loop circuit resulting from the deviation from the null in one direction or the other. When the grid potential is positive in one tube 102 and negative in the other tube 102 by reason of the above out of phase condition at the loop 95 there is plate current flowing in the tube 102 having the positive grid which results in energization of the solenoid 108 connected with the tube 102 having the positive grid. The energized coil 108 closes its contactor 106 to cause energization of a coil 86. It will be seen that the deviation of the craft from its course causes operation of the valve 85 in one direction or the other, depending upon the direction of the deviation and the valve 85 is moved in a direction to close a line 84 that actuates the power means C to cause the automatic control or pilot mechanism to move the rudder rod 10 in a manner to correct or compensate for the craft's deviation. The valve 85 remains actuated or closed as long as the craft is off its course and the power means C continues to operate so that the control part or rudder is intermittently moved until the deviation of the craft is corrected or compensated for. When the craft returns to its course there is no current flow in the circuit 98 and the circuit to the coil 86 is opened so that the valve 85 is free to return to its normal position where both of the lines 84 are open. This terminates this operation of the power means C.

The means E is provided to partially restore the power means C at the end of each active movement of the tandem bellows 56 so that the bellows are conditioned for the active stroke. The means E is operated by the power means C and is interposed in the air lines 84 between the valve 85 and the valve chest 71. In the preferred structure the means E includes a valve 110R interposed in the line 84L, a similar valve 110L interposed in the line 84R, a valve 111R for bleeding or relieving the line 84R and a similar valve 111L for bleeding or relieving the line 84L. Fig. 7 best illustrates the construction of these valves and the manner in which they are connected in the air conduit system.

The valves 110R and 110L include casings or hollow bodies 112 each closed at one side by a flexible diaphragm 113. The lines 84R and 84L communicate with the interiors of the valve bodies 112 and each line has a pipe part 114 whose end projects into a valve body 112 to oppose its diaphragm 113. Stems 115 are connected to the diaphragms 113 and their inner ends carry valves 116. The valves 116 are preferably pivoted to the stems 115 and to the walls of the bodies 112 and are arranged to close the ends of the pipe parts 114. Springs 117 are connected with the valves 116 to urge the valves to their open positions. The valves 116 are normally open so that the valve bodies 112 are, in effect, parts of the pipes of lines 84R and 84L. The diaphragms 113 do not serve to operate or move the valves 116 but operate as closures or seals which offer a minimum of resistance to movement of the stems 115. It will be seen that the closing of a valve 110R or 110L stops the air flow to a chamber 80 of the valve chest 71 and thus serves to reverse a valve 78 and cause operation of the power means C.

The relief bleeder valves 111R and 111L are adapted to be opened to allow an air flow through their respective lines 84R and 84L. The lines 84R and 84L have branches 118R and 118L, respectively. The branch 118R of line 84R extends to a point adjacent the valve 110L and the branch 118L of the line 84L extends to a point adjacent the valve 110R. The valves 111R and 111L are operable to seal against the ends of their respective branches 118R and 118L to close the same. The valves 111R and 111L are provided with spaced arms 119 pivotally supported by spaced pins 120 projecting from the adjacent supporting plate 33 and suitable lugs 121 on the plate. The pivoted valves 111R and 111L are interconnected with the valves 110L and 110R, respectively. Levers 122 are pivotally supported by pivot pins 123 on the adjacent supporting plate 33 and one end of each lever 122 is pivotally connected with a stem 115. The other ends of the levers 122 are pivotally connected with links 124 which in turn are pivotally connected with the valves 111R and 111L.

The means E further includes spring loaded or spring controlled means for suddenly operating or reversing the sets of interconnected valves 110R and 111L and 110L and 111R. Pairs of spaced connected toggle plates or members 125 are pivoted on the pins 120 that carry the valves 111R and 111L. Extensible tension springs 126 are connected with the valves 111R and 111L and have their outer ends secured to the adjacent pivoted members 125. The springs 126 are connected with the members 125 at points spaced some distance from their pivot pins 120 and are normally at the outer sides of said pins. Thus the springs 126 are disposed to normally hold the members 125 in positions where the valves 111R and 111L are closed. Adjustable stop screws 127ª on the lugs 121 may limit the outward movement of the members 125 and may position the members where the springs 126 exert a suitable closing force or holding force on their respective valves 111R and 111L. The toggle members 125 are adapted to be pivoted inwardly to move the springs 126 over the pivotal axes of the valves 111R and 111L so that the springs operate to suddenly open the valves 111L and 111R and close the related or connected valves 110L and 110R.

The means for pivoting the members 125 to throw or move the springs 126 over center will be described below. When a spring 126 is moved over the pivotal center of its respective valve 111R or 111L its tension or resiliency suddenly moves the valve away from the end of the branch 118 to open the line 84R or 84L, as the case may be, and operates to suddenly move the related or connected valve 110L or 110R so that the latter closes its respective line 84R or 84L. The tripping of a set of valves of the means E, say the valves 110L and 111R, results in the reversal or operation of the valves 78 of the power means C, the latter causing the partial return of the connected bellows 56 by admitting atmospheric pressure to the bellows 56L and by putting the bellows 56R in communication with the negative pressure line 50, so that the bellows may move from their actuated positions toward their original neutral positions. Means is provided to return or restore the toggle members 125, it being observed that the valves 111R—110L and 111L—110R are restored by their respective springs 126 when the members 125 return to their normal out positions. The means for restoring the toggle members 125 comprise torsional springs 127 at the pivot pins 120 exerting turning forces on the members (see Fig. 4).

The means for pivoting the members 125 to throw or move the springs 126 over center includes an arm 128 fixed on the shaft 35. A lever 129 is pivoted between its ends on a pin 130 on the adjacent supporting plate 33. A link 131 is pivoted to one end of the lever 129 and is connected with the arm 128. The connection between the link 131 and the arm 128 is adjustable. In the preferred construction spaced pairs of openings 132 are provided in the arm 128 and the link 131 to receive a removable pin 133. The pin 133 may be arranged in a selected set or pair of openings 132 to give the link 131 and lever 129 the desired throw. The means for throwing or moving the springs 126 over center further includes a slide 134 disposed between the spaced pairs of connected members 125. A pin 135 on the adjacent plate 33 passes through an elongate slot 136 in the slide 134 and has a head 137 cooperating with the slide to prevent displacement of the slide. A pivot pin 138 connects the slide 134 with the lever 129 so that the slide is shifted longitudinally upon turning of the shaft 35. The pairs of members 125 are oppositely directed and oppositely facing lugs 139 are provided on the opposite edges of the slide 134 to cooperate with pins 140ª on the members 125. The lugs 139 are split or bifurcated to receive the springs 126. The springs 126 pass between the spaced arms 119 and spaced members 125 and may enter between the side parts of the bifurcated lugs 139 when the members 125 are in their actuated or "in" positions.

With the valve 85 actuated to close one air line, say the line 84R, the valve 78 of the righthand bellows 56R is actuated and the valve 78 of the lefthand bellows is in its normal up position. When the shaft 59 and the rocker 39 are being turned by the bellows 56 the slide 134 moves in the same direction as the rocker and one of its lugs 139 comes into cooperation with the pins 140ª on the related set of members 125 and this cooperation pivots or moves the members. This movement of the connected members 125 continues until the spring 126 moves over the pivotal axis of the members 125 and the related valve 111R. When the spring 126 moves over this axis it suddenly pivots the valve 111R downwardly and suddenly closes the valve 110L. Opening of the branch 118R of the line 84R and closing of the line 84L reverses the valves 78 in the valve chest 71 so that the bellows 56R is put into communication with the negative pressure chamber 7 and line 50 and the bellows 56L is put into communication with the atmosphere. The tripping of the valves 110L and 111R does not occur until the righthand pawl of the means B has advanced the ratchet wheel 37 a given distance. With the valves 78 reversed as just described the bellows 56L is operated by atmospheric pressure to restore or partially restore the shafts 59 and 35 and the rocker 39. Partial restoration of the shaft 35 is accompanied by return movement of the pawl 42, as described above, and by a return movement of the slide 134. As the slide 134 moves back toward its original position the torsional spring 126 returns the actuated members 125 and when the members reach a position where the spring 126 passes the pivotal center of the valve 111R the spring suddenly reverses the valves 111R and 110L so that the branch 118R is closed and the line 84L is opened. This puts the bellows 56R into communication with the atmosphere and puts the bellows 56L into communication with the negative pressure chamber 72 and line 50 to start the next active stroke of the power means. In the event that the valve 85 remains where the line 84R is closed the power means C repeatedly operates to advance the ratchet wheel 37 and the above operations are repeated to intermittently move the rudder or control rod 10 in a given direction.

The parts of the means E are related so that the valves 110R and 111L or 110L and 111R, as the case may be, are restored to their normal condition before the slide 134 reaches its original or normal position. This restoration of the valves of the means E before the slide 134 and the shaft 35 are fully returned stops or limits the return movement of the rocker 39 and the rocker stops where its active ratchet dog 87 remains in holding cooperation with the ratchet wheel 37 to hold the rudder or control rod 10 against return movement. The means E may be adjusted to vary the stroke of the rocker 134 and the extent of advancement of the wheel 37 for each operation of the power means C. The pin 133 may be moved to cooperate with any one of the sets of openings 132 to have the shaft 35 turn through any selected arc to give the slide 134 its required stroke. In other words, the adjustment of the connection between the link 131 and the arm 128 varies the amount of turning or movement of the shaft 35 and, therefore, varies the amount of advancement of the ratchet wheel 37 at each operation of the device. The ratchet wheel 37 may be made to advance the width of one or several teeth 38 as selected, by making this adjustment.

The means F is a safety control that is readily operated by the pilot or operator to disconnect the automatic pilot or control means so that the craft may be under the full control of the operator. The safety means F is such that the automatic pilot means is made inactive insofar as its control of the rod 10 is concerned, but the automatic pilot means may continue to operate under the control of the control D without straining, jamming, or injuring any of its parts. The means F includes a latch or stop slide 140 arranged against one of the supporting plates 33 to be in adjacent relation to the means B (see Fig. 5). The slide 140 has spaced vertical slots 141 and headed pins 142 on the adjacent plate 33 cooperate with the slots 141 to guide the slide for vertical shifting. A slot 143 in the slide 140 passes the roller pin 46. The stop slide 140 has a thickened portion presenting upwardly convergent inclined faces 144. Substantially horizontal or transverse upwardly facing shoulders 145 are provided at opposite sides of the slide 140. The shoulders 145 are on unthickened portions of the slide 140 and preferably slope upwardly and outwardly.

The pawls 42 of the means B have parts engageable by the slide 140 to release the means B or to render the means B inactive. Upwardly and outwardly projecting fingers 146 are provided on the pawls 42 and each finger carries a stop pin 147. The pins 147 are engageable by the sloping faces 144 of the slide 140 when the slide is raised, as will be later described. The engagement of a pin 147 with a face 144 prevents the related pawl 42 from engaging the ratchet wheel 37 when the rocker 39 is pivoted. When the rocker 39 is pivoted with the slide 140 in its raised position a pin 147 comes into cooperation with a face 144 and the face acts as a cam or guide to guide the pawl 42 outwardly away from the wheel 37 but does not stop movement of the pawl or the rocker 39. Thus the cooperation of the pins 147 with the faces 144 does not put a drag or strain on the mechanism but serves to prevent advancement of the wheel 37 and the rudder rod 10 when the safety means F is in operation. The stop pins 147 are not sufficiently long to cooperate with the shoulders 145 and may ride on the faces 144 without engaging the shoulders. Stop pins 148 are provided on the links 91 and are engaged by the shoulders 145 when the slide 140 is raised. With the slide 140 raised to its operative position the shoulders 145 engage the pins 148 and this engagement prevents the dogs 87 from cooperating with the ratchet wheel 37. The pins 148 ride on the shoulders 145 to prevent the springs 89 from actuating the dogs 87.

The means F further includes an effective, remote control for the stop slide 140. The remote control includes a double armed lever 149 pivotally supported by a pin 150 on a supporting plate 33 (see Fig. 3). The short inner arm of the lever 149 has an operative connection with the vertically shiftable slide 140. In the case illustrated the slide 140 has a lateral lug provided with a slot 151 and a pin 152 on the inner arm of the lever 149 cooperates with the slot 151 to connect the lever and slide. Spring means is provided for yieldingly holding the slide 140 and the other elements on the safety means F in their released inactive positions. An extensible coiled spring 153 has its upper end connected with a finger 154 on the inner end of the lever 149 and has its lower end connected with a relatively fixed object. In the construction illustrated the lower end of the spring 153 is attached to the pin 146. The spring 153 is under tension and normally holds the parts in the retracted positions, illustrated, with the slide 140 in its lowermost position where it does not interfere with the operation of the means B. The spring 153 is operable to restore the slide 140 and the other elements of the means F to their normal positions following operation.

The means F further includes an air motor for operating the lever 149. The power means for operating the lever 149 may include a hollow body 155 having a flexible diaphragm 156 arranged across its interior. A link 157 is attached to the diaphragm 156 and passes from the body 155 for connection with the outer arm of the lever 149. The link 157 has a slack pivotal connection 158 with the lever 149. The portion of the body 155 above the diaphragm 156 is vented to the atmosphere. The means for operating the diaphragm 156 includes a pipe or line 159 connected with the main negative pressure line 50 and extending to a point adjacent the motor body 155. The line 159 is under the control of a master valve 160 which in turn is governed by a manual valve 161.

The master valve 160 may be similar to the valves 78 of the power means C and is arranged in a valve chest 162 associated with the body 155. The chest 162 has a negative pressure chamber 163 with which the line 159 communicates, a chamber 164 connected with the interior of the body 155 by a line 165, and a chamber 166 under the control of the manual valve 161. A line 168 passes from the chamber 166 to the valve 161. The valve 161 may be in the cockpit or at the instrument panel of the air craft to be immediately and conveniently accessible for manual operation by the pilot or operator. The valve 161 is normally closed. A diaphragm 169 for operating the valve 160 separates the chamber 166 from the negative pressure chamber 163. A bleeder 170 connects the chambers 163 and 166 to allow a controlled passage of air from the chamber 166 to the chamber 163 under certain conditions of operation. A port 171 connects the chamber 163 with the chamber 164 and a port 172 is adapted to put the chamber 164 in communication with the atmosphere. The valve 160 controls the ports 171 and 172 and is operable by the diaphragm 169. Under normal conditions with the valve 161 closed equal negative pressures exist in the chambers 163 and 166 and the valve 160 is held in the position illustrated by the atmospheric pressure acting on the under side of its upper closure or valve part. Upon opening of the valve 161 atmospheric pressure is admitted to the chamber 166 to act on the diaphragm 169 and this moves the valve down to the position where the port 172 is closed and the port 171 is open.

The valve 160 is normally in a position where it closes the port 171 and allows free passage of air through the port 172 so that the interior of the body 155 is open to the atmosphere. Thus under normal conditions there is atmospheric pressure at opposite sides of the operating diaphragm 156 and the spring 153 holds the slide 140 in its retracted down position. When the manual valve 161 is opened the valve 160 is reversed so that the body 155 is put into communication with the negative pressure line 159 and the diaphragm 156 is operated to pivot the lever 149 and thus raise the stop slide 140 to its "up" operative position. The means F is readily controlled by the operator or pilot to release the means B so that the rack 11 and rudder or control rod 10 are fully freed from the operating means B of the automatic pilot mechanism and the rudder rod may be under the full control of the manual operating or directing means. The means F is quickly controlled by the operation of the valve 161 which may be located as found most convenient. Upon closing of the valve 161 the valve 160 is reversed to return to the normal position illustrated where the body 155 is in communication with the atmosphere. The spring 153 returns the slide 140 and the lever 149 to their normal inactive positions.

The invention may include means for rendering the power means C inoperative when the rod 10 and rack 11 reach predetermined positions at the ends of their range of movement. This means is a safety means and is entirely automatic. The safety means includes branch lines 173 communicating with the lines 84R and 84L. The branch lines 173 extend to points adjacent the rack 11. The branch lines 173 are normally closed by pivotally or resiliently mounted valves 174. Longitudinally spaced projections or fingers 175 are provided on the rack 11 to cooperate with the valves 174. The fingers 175 are spaced apart and are related to the valves 174 so that one finger is operable to open the valve 174 of the branch line 173 communicating with the line 84R when the rack 11 approaches the extreme end of its movement in one direction and the other finger 175 operates to open the valve 174 controlling the branch line of the line 84L when the rack 11 reaches the other end of its stroke. The opening of a valve 174 admits atmospheric pressure to the line 84R or 84L that is closed by the valve 85 and thus temporarily prevents the operation of the power means C. When the rack 11 returns to a position where it is within its intended range of movement the valve 174 closes to re-establish operation of the power means C.

The various elements of the power means C, the means E, the means F and the associated parts may be contained in the case 30 and the case is preferably formed so that it may be opened to render the various parts readily accessible for servicing, etc.

While the operations of the several means and elements of the automatic pilot have been described above in connection with the detailed descriptions of the mechanism it is believed that the mode of operation of the device will be better understood from the following description of the general operation of the entire mechanism. In the drawings the characters R and L, used as exponents of the reference numerals and associated with the arrows of direction designate elements and directions of movement for effecting movement of the rudder rod or control rod 10 for the directing of the craft to the right and left, respectively. It will be assumed that the craft is in flight and is following a course as defined by a radio beam or radio broadcast and that the radio receiving circuit 99 is tuned for the reception of said beam or broadcast so that the radio compass circuit 98 is sensitive to deviations of the craft from the beam or broadcast. It will be further assumed that the hook 21 is in cooperation with the pin 22 and that the valve 161 is closed so that the automatic pilot is in operation for the control of the rod 10. So long as the craft remains on the course the parts are in the normal or idle positions illustrated, the valve 85 and the bellows 56 being neutral and the means B being free or clear of the ratchet wheel 37 so that the rudder rod 10 is free. The valves 78 are both normally in the positions illustrated where the interiors of the bellows 56R and 56L are in communication with the negative pressure chamber 72 and line 50.

In the event that the craft deviates from its course because of air current conditions or for other causes the automatic pilot operates to intermittently move the rod 10 in a direction to compensate for the deviation and this intermittent operation continues until the plane returns to its course. For example, if the craft deviates to the left an electric current is set up in the meter circuit of the radio compass 98 to energize a coil 108 and thus close the energizing circuit to the right coil 86. The coil 86 moves the valve 85 so that it closes the line 84R. Closing of the line 84R closes off the chamber 80, associated with the bellows 56R, from the atmosphere to cause reversal of the valve 78 of the bellows 56R, the valve 78 moving downwardly by gravity or by the atmospheric pressure acting on the top surface of the valve 78, or both. When this occurs the interior of the bellows 56R is put into communication with the atmosphere so that the pressures on the opposite surfaces of the diaphragm 57 of the bellows are equalized. As the interior of the bellows 56L remains in communication with the negative pressure chamber 72 and line 50, the atmospheric pressure acting on the outer surface of the diaphragm 57 of the bellows 56L operates the tandem bellows. Operation of the bellows 56R and 56L turns the shafts 59 and 35 and shifts the slide 134.

Upon turning of the shaft 35 the rocker 39 swings to engage a dog 87 with the teeth of the ratchet wheel 37 and then engage a pawl 42 with the ratchet wheel to turn the wheel and thus move the rack 11 and the rod 10. During this operation of the means B a slide lug 139 pivots its related toggle members 125 and this pivoting of the toggle members continues until the related spring 126 passes over the center of pivotal movement of the valve 111R. When this occurs the spring 126 suddenly opens the valve 111R and closes the interconnected valve 110L. Opening of the valve 111R reverses the valve 78 of the bellows 56R so that this bellows is again put into communication with the negative pressure chamber 72 and the line 50. Closing of the valve 110L reverses the valve 78 of the bellows 56L so that this bellows is put into communication with the atmosphere causing restoring of the bellows 56R and 56L. This operation of the bellows in a reverse direction moves the shafts 59 and 35 to reverse or restore the means B and the means E. However, the means B and E are only partially restored and the rocker 39 stops before the active dog 87 is released from the ratchet wheel 37.

The restoring operation is terminated before the means B and E are fully restored because of the relationship of the lugs 139 and the toggle members 125. During the restoring cycle the lug 139 engaging the actuated toggle members 125 moves back sufficiently to allow the spring 127 to pivot the toggle members a distance sufficient to move the spring 126 over the pivotal center of the valve 111R before the rocker 39 reaches its normal or initial position. When the spring 126 moves over the pivotal center of the valve 111R it suddenly closes the valve 111R and opens the valve 110L to reverse the valves 78 of the power means C. Closing of the valve 111R closes off the chamber 80 of the bellows 56R from the atmosphere so that the pressures on the opposite sides of the diaphragm 79 are equalized and the valve 78 moves down by gravity, or by the atmospheric pressure, or both. Opening of the valve 110L admits atmospheric pressure to the chamber 80 of the bellows 56L and this pressure acting on the diaphragm 79 moves the valve 78 up to put the interior of the bellows 56L into communication with the negative pressure chamber 72. This reversal of the valves 78 conditions the bellows 56 for another active stroke and the power means C acts to turn the shafts 59 and 35 so that the means B again advances the ratchet wheel 37 and the rudder rod 10. These operations continue so that the rod 10 is intermittently advanced or moved to compensate for the deviation of the craft from its course. It is to be understood that the valve 85 remains in a given closed position so long as the craft is off its course.

When the craft is returned to its course through the operations described above, the current flow in the radio compass circuit 98 ceases and the coils 108 and 86 that have been energized become de-energized. This allows the valve 85 to return to its neutral position where the lines 84R and 84L are both open to the atmosphere. With the lines 84R and 84L both open to the atmosphere the bellows valves 78 assume their normal positions illustrated in Fig. 3 where the bellows 56R and 56L are in communication with the negative pressure chamber 72 and line 50 and the power means C is inactive. Upon the last stroke or operation of the power means C immediately following the restoration of the valve 85 to its normal position the bellows 56 return to their neutral positions under the action of the spring 70 and thus restore the means B and E to their normal states. When the means B is restored to its normal condition the previously active dog 87 is freed from the wheel 37 and the pawls 42 are both made inactive. This frees the rack 11 and the rudder rod 10.

If at any time during the flight it is desired to disconnect the automatic pilot from the rudder rod 10 the operator or pilot may open the valve 161. Opening of the valve 161 operates the means F as described above, so that the slide 140 is brought to the position where it holds the dogs 87 and the pawls 42 against operation. The means B may be held inoperative by the means F so long as the valve 161 is open and with the means B thus held inoperative the rack 11 and the rod 10 are disconnected from the automatic pilot means so that actuation of the pilot means does not affect the rudder rod 10. In the case of an emergency the automatic pilot means may be quickly disconnected from the rudder rod 10 by pulling the ring 26 to disengage the hook 21 from the pin 22. The receiver or receiving circuit 99 is, of course, provided with connections 190 (see Fig. 1), to permit the use of ear phones or the line which may assist the operator in tuning the circuit, etc.

The pilot means or control means of the present invention has a wide applicability being useful on vessels, vehicles, conveyances, and craft of many kinds. Accordingly, where I herein employ the term "craft" I refer to air craft, vehicles, ships, carriers, vessels, torpedoes, and conveyances of various natures for use on land and sea and for use in the air. Where the term "dirigible craft" is employed it refers to any craft that may be controlled, directed, or steered.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A control mechanism for a craft having a movable control part, the control mechanism comprising reversible pneumatic power means, intermittent drive means operable by the power means to move said part in either direction, valve means governing the pneumatic means operable to cause actuation of the pneumatic means in either direction, oscillator means interposed between the valve means and the power means for producing oscillatory operation of the power means during each period of valve operation, and means for actuating the valve means to cause operation of the pneumatic means in either direction.

2. Means for operating a control part of a dirigible craft comprising a reversible differential fluid pressure power means, an intermittent movement mechanism operable by the power means for moving said part by successive movement impulses during each operation of the power means, means producing a differential of pressure for operating the power means, valve means for initiating operation of the power means either to the right or to the left and for terminating operation of the power means, a differential pressure means controlling the valve means to cause operation of the power means in either direction, a line governing the differential pressure means, and a control for said line.

3. Means for operating a control part of a dirigible craft comprising a reversible power means including a pair of bellows connected in tandem, drive means operated by the power means for moving the control part, a source of negative air pressure, valve means for each bellows controlling the communication of its respective bellows with the atmosphere and said source of negative pressure, means for controlling the valve means, and spring detent means associated with the power means for restoring the bellows to normal when the valve means are restored after operation.

4. Means for operating a control part of a dirigible craft comprising a reversible power means including two air motor chambers, diaphragms at the chambers operable by a differential in internal and external pressures and connected for movement in unison, means operable by the power means for intermittently moving the control part in either of two directions, means conditioned by the power means operable to prevent reverse movement of said part during intermittent advancement of the same in either direction released upon the return of the diaphragms to their neutral positions, a control for the power means operable to cause operation of the power means in either direction including air lines connected with the chambers, and means controlling the air lines to prevent the return of the diaphragms to their neutral positions during operation of the power means.

5. Means for operating a control part of a dirigible craft comprising a pneumatic power means operable to produce reciprocable movement and reversible to produce active motion in opposite directions, means operable by the power means for intermittently moving said control part in opposite directions, means for restoring the power means to a neutral position at the termination of a phase of operation in either direction, releasable means put into operation when the power means is operated to prevent reverse movement of the said part during the return strokes of the power means in a plane of its operation and released when the power means reaches said neutral position, valve means controlling the power means, valve operating means operable to retain the valve operated for substantial periods, and means controlling the valve means to prevent the return of the power means to its neutral position so long as said valve operating means is in operation.

6. Means for operating a control part of a dirigible craft comprising a reciprocable power means, means operated by the power means for intermittently moving said control part, a control for the power means, means tending to restore the power means to a neutral position, releasable means for preventing reverse movement of the control part during the reverse strokes of the power means, means acting on said control to prevent the return of the power means to said neutral position while the control remains active, and manually governed means for making the intermittent movement means and said releasable means inactive whereby the said part is freed.

7. Means for operating a control part of a dirigible craft comprising a reciprocable power means, means operated by the power means for intermittently moving said control part, a control for the power means, means tending to restore the power means to a neutral position, releasable means for preventing reverse movement of the control part during the reverse strokes of the power means, means acting on said control to prevent the return of the power means to said neutral position while the control remains active, and remotely controlled means for holding the intermittent movement means and said releasable means released whereby said part is freed and operation of the power means does not affect the said part.

8. In a mechanism of the character described for operating a control part of a dirigible craft, the combination of, a differential pressure power means, the power means producing reciprocal motion and being reversible to have active strokes in either direction, a shaft driven by the power means, a rocker secured to the shaft to be oscillated by the power means, driving means for said control part including a ratchet wheel, pawls on the rocker cooperable with the ratchet wheel to move the control part in either direction, means normally holding the pawls released from the wheel operable to release one pawl and restrain the other pawl upon movement of the rocker from its neutral position, and means for governing the power means.

9. In a mechanism of the character described for operating a control part of a dirigible craft, the combination of, a differential pressure power means, the power means producing reciprocal motion and being reversible to have active strokes in either direction, a shaft driven by the power means, a rocker secured to the shaft to be oscillated by the power means, driving means for said control part including a ratchet wheel, pawls on the rocker cooperable with the ratchet wheel to move the control part in either direction, means normally holding the pawls released from the wheel operable to release one pawl and restrain the other pawl upon movement of the rocker from its neutral position, stop dogs for engaging with the wheel to hold it against movement, means operated by the rocker normally holding the dogs retracted from the wheel and releasing a dog upon active movement of the rocker in either direction so that the released dog prevents reverse movement of the control part during the return strokes of the power means, and means for governing the power means.

10. In a mechanism of the character described for operating a control part of a dirigible craft, the combination of, a differential pressure power means, the power means producing reciprocal motion and being reversible to have active strokes in either direction, a shaft driven by the power means, a rocker secured to the shaft to be oscillated by the power means, driving means for said control part including a ratchet wheel, pawls on the rocker cooperable with the ratchet wheel to move the control part in either direction, means normally holding the pawls released from the wheel operable to release one pawl and restrain the other pawl upon movement of the rocker from its neutral position, and means for governing the power means, the last mentioned means including regulating means for varying the length of the active strokes of the power means.

11. In a mechanism of the character described for operating a control part of a dirigible craft, the combination of, a differential pressure power means, the power means producing reciprocal motion and being reversible to have active strokes in either direction, a turnable shaft driven by the power means, an element operatively connected with said control part to move the same, a ratchet drive between the shaft and said element, projections on said element, stop means actuated by the projections to terminate operation of the power means at the opposite ends of the stroke of the element, and a control for the power means.

12. Means for operating a control part of a dirigible craft comprising an operating mechanism for moving said part comprising a differential fluid pressure power means reversible to operate in both directions, means operable by the power means to intermittently advance the said part in either direction, a control for the power means, and oscillator means interposed between the control and power means and operated by the second named means for causing oscillatory operation of the power means.

JESS S. MORRISON.